United States Patent Office 3,560,404
Patented Feb. 2, 1971

3,560,404
REACTIVATING PYROPHORIC TYPE CATALYSTS IN AN ORGANIC SOLVENT
Margarete Jung, Kelkheim, and Hans H. von Dohren, Frankfurt am Main, Germany, assignors to Varta Aktiengesellschaft, Frankfurt am Main, Germany
No Drawing. Filed Dec. 20, 1967, Ser. No. 691,986
Claims priority, application Germany, Dec. 30, 1966, V 32,673
Int. Cl. B01j 11/02, 11/30
U.S. Cl. 252—414            7 Claims

ABSTRACT OF THE DISCLOSURE

Process for the reactivation of deactivated hydrogenation catalyst which as main catalytic components contain catalytically active forms of the metallic elements iron, nickel and cobalt comprising introducing the catalyst to be reactivated into a non-aqueous organic liquid and contacting such catalyst therein with a strong reducing agent, such as, hydrazine, borohydrides or hypophosphites until development of gaseous hydrogen occurs.

BACKGROUND OF THE INVENTION

The invention relates to a process for the reactivation of hydrogenation catalysts with strong reducing agents.

Hydrogenation catalysts containing active forms of Ni, Co or Fe in their active form contain large quantities of hydrogen attached thereto or incorporated therein and when such dry catalysts come into contact with air they undergo spontaneous combustion (that is, they are pyrophoric) and thereby irreversibly lose their catalytic activity. As a consequence, means have been devised to preserve or deactivate such active catalysts in such a way that they no longer exhibit pyrophoric properties but can be reactivated by the reintroduction of hydrogen therein.

The catalytically active forms of Ni, Co and Fe can be prepared in various ways, for example, they can be precipitated in the form of their oxalates from aqueous solutions of their soluble salts and then reducing such oxalates with hydrogen, whereby metallic powdered catalysts of large surface area which have large quantities of hydrogen incorporated therein are obtained. Another catalytically active form of such metals are the Raney catalysts or skeleton catalysts which are obtained by alloying the Ni, Co or Fe with less noble components such as aluminum, zinc, silicon or magnesium, comminuting the alloy and dissolving the less noble component therefrom with aqueous alkali or acid solutions. In this instance the hydrogen evolved in the aqueous solution is again incorporated in the remaining metallic catalyst and the resulting catalyst again is pyrophoric.

The deactivation or preserving of such active catalysts is effected by removal of the hydrogen attached thereto by treatment with chemicals which are able to take up hydrogen such as, for example, hydrogen peroxide, chlorates, iodates, bromates. In some instances the deactivation may also involve the formation of superficial layers of oxides or compounds of the metals with other compounds of the deactivation agent on the catalyst.

The reactivation involves the reincorporation of hydrogen in the catalyst and possibly the decomposition of the superficially formed compounds.

It is known that exhausted Raney catalysts which initially had only been partially activated can again be treated with an alkali solution in order to restore their original activity. During such reactivation the catalyst is again charged with hydrogen by the aluminum which goes into solution (U.S. Pat. No. 2,094,117).

According to U.S. application S.N. 585,548, filed Oct. 10, 1966, it was recognized that hydrogen can again be easily incorporated in Raney nickel which has been incorporated in so-called double skeleton catalyst electrodes and which had been freed of hydrogen, by heating the electrolyte surrounding the electrode to about 50–80° C. and at the same time supplying gaseous hydrogen to the electrode.

In addition, it has been proposed, in German Pat. No. 1,156,768, to use strong reducing agents, especially alkali metal borohydrides and lithium aluminum hydride in alkaline solution for the activation of porous bodies of one or more metals or alloys of the IV, V, VI, or VIII group of the Periodic System which are capable of having hydrogen incorporated in their lattice.

All of the regeneration processes thus described are carried out with the catalyst or catalyst body within an aqueous solution.

In many instances, it is necessary that the active form of the hydrogenation catalyst is incorporated in an organic solvent before it is introduced into the hydrogenation vessel in which the hydrogenation is carried out. Therefore, there has been a need for the development of a process in which the activated catalyst is obtained directly in an organic solvent. When according to the previously known processes the catalyst is first reactivated in an aqueous solvent, it only can be transferred into an organic solvent in a very cumbersome and time consuming manner. These disadvantages of the known reactivating processes which are carried out in aqueous solutions become especially apparent when even the presence of traces of water have a disturbing influence on the subsequent hydrogenation processes.

SUMMARY OF THE INVENTION

According to the invention it was found that hydrogenation catalysts such as those which contain nickel, iron or cobalt as the active catalytic components which have been deactivated by the removal of the hydrogen attached thereto when in active form could be reactivated by introducing the dry deactivated catalyst in unsupported or supported form in the form of a powder or pieces into an essentially water free organic solvent selected from the group consisting of alcohols which as a maximum can contain up to 10 wt. percent of water as an admixture, squalane, paraffin oils, dioxane which can contain up to 5 wt. percent of water as an admixture, liquid aromatic hydrocarbons and mixtures of such compounds, then adding to the organic solvent containing the catalyst to be reactivated, a strong reducing agent having a potential which is more negative than the reversible hydrogen potential, the quantity of water in said system not substantially exceeding that required for the chemical reaction between the reducing agent and the catalyst, permitting the reducing agent to react with the catalyst until a strong evolution of hydrogen at the catalyst particles signifying the end of the reactivation can be observed.

DETAILED DESCRIPTION OF THE INVENTION INCLUDING PREFERRED EMBODIMENTS

As has previously been indicated, the activated hydrogenation catalysts contain substantial quantities of hydrogen attached thereto which when the catalysts come into contact with air ignite. In most instances this impairs the activity of the catalyst material. Therefore, in view of the danger of fire the catalyst material after its activation and before its storage in contact with air is preserved or deactivated by removal of the hydrogen contained therein. The preserved or deactivated catalysts can then be stored for longer periods of time in contact with air without danger. However, before use of the catalyst for hydrogenation it must again be reactivated by charging it again with hydrogen as it is only catalytically active when thus charged. In some preserving or deactivating procedures easily reducible oxide layers are also formed at the catalyst surfaces. Such oxide layers must also be removed during the reactivation of the catalyst. In such instances, the hydrogen first combines with the oxygen of the oxides and only thereafter becomes attached to the catalyst material.

In the previously known processes for reactivating hydrogenation catalysts in aqueous solutions of alkali metal borohydrides, the reactivation solution employed therefor was completely water. In contrast thereto, it is possible, in the process according to the invention, to keep the water content of the organic solvent in which the finished reactivated catalyst is obtained as small as possible and in each instance to reduce it to the quantity which is still permissible in the subsequent intended use of the catalyst for hydrogenation. The reducing agent can be added to the organic solvent containing the catalyst to be reactivated in a completely water free solid or liquid form. This is possible when the reducing agent employed sets hydrogen free in the absence of water. This, for example, is the case when sodium metal in 100% alcohol is employed as the reducing agent. Some strong reducing agents require a certain amount of water in order to set free the hydrogen necessary for the reactivation as is, for instance, exemplified by the following equations:

(a) $x\text{Ni} + y/8\text{NaBH}_4 + y/4\text{H}_2\text{O} = \text{Ni}_x\text{H}_y + y/8\text{NaBO}_2$
(b) $x\text{Ni} + y/2\text{NaH}_2\text{PO}_3 + y/2\text{H}_2\text{O}$
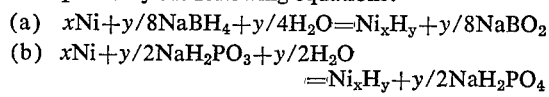
$= \text{Ni}_x\text{H}_y + y/2\text{NaH}_2\text{PO}_4$ In this case the reactivation solution can in addition to the reducing agent contain a quantity of water which corresponds to the stoichiometric quantity required for the conversion of the reducing agent. In this instance, also, the catalyst after activation is obtained in a water free organic liquid. In some instances it is possible to add a certain small excess of water over the stoichiometric quantity with the reducing agent. This is the case when the presence of small quantities of water in the organic liquid containing the reactivated catalyst is permissible for the hydrogenation reaction contemplated. In addition, it often is possible to remove a relatively small quantity of water from the organic solvent by usual simple drying or distillation procedures or also, for example, when the water does not mix with the organic solvent employed by usual separation procedures. In the above, the water content of the reactivation solution includes water of crystallization, as well as free water.

The strong reducing agents which are contemplated for the process according to the invention are reducing agents which have a potential which is more negative than the reversible hydrogen potential. For example, with reference to the hydrogen potential the reducing agent hydrazine hydrate has a potential of $-0.332$ v. and the reducing agent sodium dihydrogen phosphite has a potential of $-0.284$. Sodium hypophosphite also is a strong reducing agent having a potential of $-1.862$. The strong reducing agents available for the process and their potentials can be ascertained from "Oxidation Potentials," W. M. Latimer, Prentice Hall, 1938, 1953, 1955, 1956, 1959.

In the instances, when the deactivated catalyst material contains thin surface oxide layers, the hydrogen of the reducing agent first reacts with the oxygen of the oxide layers to form water and therefore the quantity of water added to the organic liquid to provide the necessary stoichiometric amount may be reduced by the quantity produced by reaction with the oxide layers.

According to the invention it has been found advisable to employ such reducing agents as are at least partially soluble or emulsifiable in the non-aqueous liquid. Hydrazine and its functional derivatives, borohydrides and the salts of hypophosphorous acid have proved especially suited. According to an advantageous embodiment of the process according to the invention the reducing agent is added to the non-aqueous liquid before the catalyst to be reactivated is introduced therein.

Organic liquids which are difficult to hydrogenate such as aliphatic and aromatic hydrocarbons, alcohols, ethers and esters either singly or in mixtures have been found well suited as the non-aqueous organic liquids employed according to the invention. Liquid aromatic or aliphatic hydrocarbons such as squalane and paraffin oil and alcohols have been found particularly suited. Of the alcohols, methanol, ethanol and isopropanol are especially well suited.

Whereas during the reactivation of substances which are very active catalytically they must be cooled during their recharging with hydrogen, it can be advantageous with other catalysts which are not as active to heat the essentially non-aqueous liquid before and/or during the reactivation to higher temperatures. A temperature range between about 10 and 100° C., preferably, between 25 and 50° C., has been found suited.

As soon as the evolution of gaseous hydrogen in the non-aqueous liquid indicates that the catalyst has been charged with hydrogen it is expedient to filter off the catalyst and to wash it with a low boiling non-aqueous solvent.

The following examples will serve to illustrate the process according to the invention.

EXAMPLE 1

10 ml. of an 80% hydrazine hydrate solution in water were added to a suspension of 50 g. of deactivated Raney-nickel powder in squalane. After about 30 minutes a strong evolution of gas initiated in the powder. The catalyst was filtered off and the thus reactivated Raney-nickel washed with toluene and subsequently with a mixture of benzene and methanol. A sample withdrawn from the reactivated catalyst showed that, after evaporation of the solvent, the catalyst again was pyrophoric.

In case the solvent still contains small quantities of water this can be removed after evolution of the gaseous hydrogen subsided by heating the dispersion to about 105° C. The activity of the catalyst was not impaired by this increase in temperature.

EXAMPLE 2

10 ml. of an 80% solution of hydrazine hydrate in water were added to a suspension of 50 g. of dried deactivated Raney-nickel powder in paraffin oil. Strong gas evolution began after a reaction period of only 4 minutes. The suspension heated up to about 70° C. during this period of time. After removal of the paraffin oil the catalyst was again active and pyrophoric.

EXAMPLE 3

30 ml. of an 80% solution of hydrazine hydrate in water were added to a suspension of 50 g. of deactivated Raney-nickel powder in methanol. A strong evolution of gas was observed after about 10 minutes. The catalyst after removal of the methanol was highly active and pyrophoric.

EXAMPLE 4

A nickel catalyst produced from nickel carbonate which had been precipitated on kieselguhr and reduced under a stream of hydrogen at 380° C. was treated after cooling down for an hour with a 5% aqueous solution of potassium chlorate to effect its deactivation. After washing to remove the deactivating agent the catalyst was washed with acetone and dried at 50° C. under vacuum. The catalyst thus obtained was no longer pyrophoric. Its nickel content was 41.1%.

To effect reactivation of the catalyst it was suspended in ethanol and 2 ml. of a 80% solution of hydrazine hydrate in water added per 10 g. of catalyst. The suspension was then heated to 40–50° C. After a few minutes a strong increase in the catalyst volume as well as a strong evolution of hydrogen was observed. After the evolution of hydrogen subsided the catalyst was filtered off and washed with ethanol. It again had strong pyrophoric properties.

The reactivated catalyst was excellently suited for the reduction of nitrobenzene to aniline. For instance, when 3.2 g. of the catalyst powder were suspended in 100 ml. of ethanol in which 10 ml. of nitrobenzene had been dissolved, 10 ml. of hydrogen per minute were consumed from the solution for the hydrogenation of the nitrobenzene.

EXAMPLE 5

20 ml. of an 80% solution of hydrazine hydrate in water were added to 50 g. of deactivated Raney-cobalt suspended in dioxane. Thereafter the mixture was heated for about 5 minutes to 40° C. After a short time a strong hydrogen evolution began at the catalyst whereupon the suspension was allowed to cool and the catalyst filtered off, washed and dried. The thus treated catalyst again exhibited its full catalytic activity and also again was pyrophoric.

EXAMPLE 6

50 g. of deactivated Raney-nickel were suspended in 90% ethanol (10% $H_2O$) and thereafter 30 g. of sodium dihydrogen phosphite were added thereto. After the mixture was heated to 55° C. strong evolution of hydrogen initiated at the catalyst. After cooling and recovery, samples of the thus treated Raney nickel indicated that it had recovered its full activity.

EXAMPLE 7

50 g. of preserved Raney-nickel were suspended in 95% dioxane (5% $H_2O$) and 30 g. of sodium dihydrogen phosphite added thereto and the mixture heated to 50° C. After a short time strong evolution of hydrogen began at the Raney-nickel. After recovery of the thus treated Raney-nickel it was again catalytically active and strongly pyrophoric.

EXAMPLE 8

20 g. of a nickel catalyst obtained by precipitation of nickel carbonate on magnesium and reduction at 300° C. in a hydrogen stream which was strongly pyrophoric when in contact with air could be stored in air after treatment with a 5% aqueous potassium chlorate solution.

In order to reactivate such catalyst it was suspended in benzene and thereafter 10 g. of potassium dihydrogen phosphite and a trace of water added thereto. The mixture was heated for 10 minutes to 50° C. under a reflux condenser. After this treatment the catalyst was again active and could again be used for the hydrogenation of nitrobenzene to aniline.

When salts of phosphorous acid are used as the reducing agent as the alkali metal dihydrogen phosphite in Examples 6, 7 and 8, a small quantity of water must be present in the liquid reaction medium in order to make the initiation and completion of the reaction possible.

EXAMPLE 9

A highly active cobalt catalyst powder having hydrogen attached thereto was produced by precipitating cobalt carbonate in a solution containing barium sulfate on the barium sulfate and after washing with water reducing the moist material with a stream of hydrogen at 350° C. The material was then after cooling out of contact with air introduced into a 5 wt. percent aqueous solution of potassium iodate. After 2 hours' treatment the resulting deactivated catalyst which no longer contained any attached hydrogen was washed with distilled water and dried at 40° C. under vacuum. The deactivated catalyst thus obtained could be stored as long as desired in contact with air without undergoing any changes.

For reactivation the deactivated catalyst was introduced into a 2 wt. percent alcoholic solution of sodium borohydride which contained 5 wt. percent of water. The mixture was heated to 50° C. under a reflux condenser. In 2 minutes a strong evolution of free hydrogen could be observed at the catalyst particles and the reactivation was complete.

We claim:
1. A process for the reactivation of a deactivated hydrogenation catalyst selected from the group consisting of iron, nickel, cobalt and alloys of the foregoing, and which has been placed in a deactive and non-pyrophoric state by removal of its activating hydrogen therefrom which comprises forming a mixture of the deactive catalyst in subdivided form and a substantially water-free, organic solvent selected from the group consisting of alcohols containing up to no more than about 10% by wt. of water, squalane, paraffin oils, dioxane containing up to no more than about 5% by wt. of water, liquid aromatic hydrocarbons, and mixtures of the foregoing, thereafter adding salts of hypophosphorous acid to the mixture as a strong reducing agent, said reducing agent being at least partially soluble in said organic solvent, the quantity of water present in said mixture not substantially exceeding that required for the chemical reaction between the reducing agent and the catalyst, and permitting the reducing agent to react with the catalyst for a period of time sufficient to achieve a strong evolution of hydrogen from the mixture, thereby insuring the production of an active hydrogenation catalyst in an organic solvent which is substantially free of water.

2. The process of claim 1, wherein the reducing agent is alkali metal hydrogen phosphite.

3. The process of claim 1, wherein the reducing agent is alkali metal hypophosphite.

4. The process of claim 1, wherein the reducing agent is sodium dihydrogen phosphite.

5. The process of claim 1 in which said reducing agent is potassium dihydrogen phosphite.

6. The process of claim 1 in which said organic solvent is a lower alkanol.

7. The process of claim 1 in which said reactivation is carried out at a temperature between 10 and 100° C.

References Cited

UNITED STATES PATENTS

| 2,609,346 | 9/1952 | Faulkner | 252—430 |
| 2,780,614 | 2/1957 | Harvey | 252—472X |
| 2,865,865 | 12/1958 | Ockreht | 252—430 |
| 3,139,408 | 6/1964 | Tumer et al. | 252—466 |
| 3,165,478 | 1/1965 | Hauschild et al. | 252—414X |

FOREIGN PATENTS

| 692,300 | 6/1953 | Great Britain | 252—411 |
| 1,156,768 | 11/1963 | Germany | 252—420 |

DANIEL E. WYMAN, Primary Examiner

P. E. KONOPKA, Assistant Examiner

U.S. Cl. X.R.

252—430, 466, 472, 477